July 25, 1933.  L. E. GREINER, JR  1,919,630
CLINICAL THERMOMETER
Filed July 30, 1928
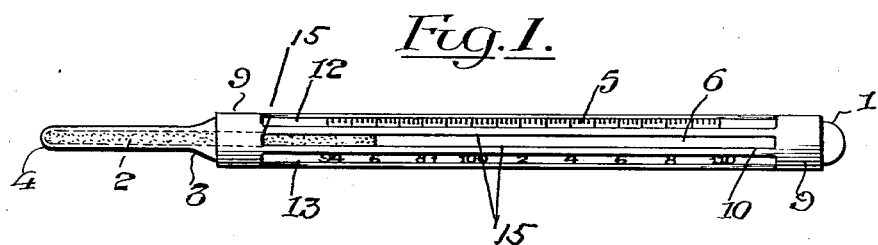
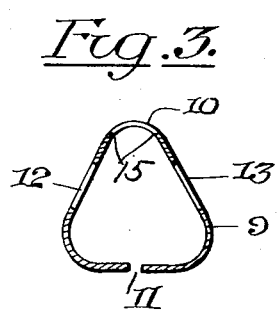
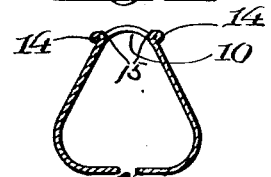
Inventor
Leopold E. Greiner Jr.
by his Attorney Patented July 25, 1933

1,919,630

UNITED STATES PATENT OFFICE

LEOPOLD E. GREINER, JR., OF NEW YORK, N. Y.

CLINICAL THERMOMETER

Application filed July 30, 1928. Serial No. 296,152.

This invention relates to thermometers, particularly to the clinical and chemical type of thermometer, the object of the invention being to improve this class of thermometers thereby to facilitate the reading thereof.

Clinical thermometers are provided with a very restricted bore for the thread-like passage of the mercury in its column, which is difficult for even skilled persons to accurately read, especially in a poor light, and consequently mistakes are frequently made in the reading thereof. Various attempts have been made to overcome this objectionable feature, but owing to the small size of the instrument, this difficulty has not been entirely eliminated even though it has been the general practice to provide such thermometers with a magnifier.

Therefore, it is the object of the present improvement to provide a thermometer of the class described so constructed as to facilitate the reading thereof, and as far as possible prevent mistakes in such reading and to do this in a simple, inexpensive and practical manner, which will not interfere with the commercial production or sale of the article.

In the drawing accompanying and forming part of this specification, Fig. 1 is a view of one form of this improved thermometer; Fig. 2 is a view of another form thereof; Fig. 3 is a cross sectional view of a part of the device shown in Fig. 1, and Fig. 4 is a cross sectional view of a somewhat different form of shield.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing, since the invention is capable of other embodiments and that the phraseology which I employ is for the purpose of description and not of limitation.

The thermometer, in a general way, comprises a stem 1 of glass having a mercury bore or passage 2 and the usual constricted portion 3 communicating with the mercury bulb 4. The thermometer is provided with the usual degree marking 5 which may be applied in any suitable way, the thermometer being suitably frosted so as to leave a magnifying portion of clear glass 6, and in the present instance, this frosting is applied after the degree marking has been applied, and all three sides of the thermometer or only two sides facing the magnifying portion or prism may be frosted, as may be desired. It has heretofore been the practice to frost the thermometers prior to the application of the degree marks, but in the present improved thermometer, I find it practical to frost the instrument after these degree marks have been applied.

In the form of my invention shown in Fig. 1, I provide a shield 9 made of some suitable light weight material such as celluloid or aluminum, and which may be transparent, if desired, and shaped to conform to the shape of the thermometer, but provided with a slot 10 of just sufficient size to permit the prismatic or magnifying portion of the thermometer to be in view. This shield is also slotted as at 11, thereby to insure that it will resiliently clamp on to the thermometer, and also to permit the proper expansion thereof. The shield is of the proper length to enclose the reading part of the thermometer, and when this shield is used, it is unnecessary to frost the thermometer or to provide it with colored border lines to facilitate the reading thereof.

In the form of the invention shown in Fig. 1, in addition to the slot 10 through which the mercury may be observed, and the expansion slot 11, the shield may also have slots or openings 12 and 13 at opposite sides, this particular form of shield being adapted for that class of thermometers where the scale is on one side and the temperature degree markings are on the opposite side.

When the thermometer is of that type having all the markings on one side, the shield will be provided with an opening only at one side.

In the form shown in Fig. 4, the edges of the slotted portion through which the mercury may be observed are curled or rolled as at 14 to provide a reinforcing and protected edge. This shield may be readily slipped over the thermometer and not only acts as a protection to prevent breakage, but may also act as a casing therefor. In fact it may be made as a part of the screw cap or casing so as to enclose the entire thermometer, if desired, but in all forms thereof, the edges of the slot along the casing are colored as at 15, preferably red, thereby very materially facilitating the reading of the thermometer, and preventing misreading thereof, even in a poor light.

In the form of the invention shown in Fig. 2, the degree marks are applied directly to the shield, instead of to the glass of the thermometer, in which case, of course, it will be necessary that the shield have a fixed position relatively to the thermometer.

From the foregoing, it will be observed that in all the forms of the present improvement, the magnifying portion of the thermometer is very clearly defined by the colored border lines at the opposite sides and ends of this magnifying portion of the thermometer, thereby materially facilitating the proper reading thereof.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A thermometer of the class described having a single split shield covering and protecting the thermometer all around the readable part thereof and for a predetermined distance therebeyond and having a longitudinal slot alined with the prismatic or magnifying portion of the thermometer and of less length than said shield, said shield being split its entire length in parallelism with said slot.

2. A thermometer of the class described having a shield covering and protecting the thermometer and having a longitudinal slot alined with the prismatic or magnifying portion of the thermometer, said shield having the longitudinal and/or transverse edges of its slot colored.

3. A thermometer of the class described having a resilient shield covering and protecting the thermometer and having a longitudinal slot alined with the prismatic or magnifying portion of the thermometer, said shield having the longitudinal and/or transverse edges of its slot colored and said shield being slit to resiliently engage the thermometer.

4. A thermometer of the class described having a shield covering and protecting the thermometer all around the readable part thereof and for a predetermined distance therebeyond and having a longitudinal slot alined with the prismatic or magnifying portion of the thermometer, said shield having reinforced edges along the parallel edges of its slot.

5. A thermometer of the class described having a shield covering and protecting the thermometer all around the readable part thereof and for a predetermined distance therebeyond, and having a longitudinal slot alined with the prismatic or magnifying portion of the thermometer, said shield having curled or bent edges along the parallel edges of its slot.

6. A thermometer of the class described having a shield covering and protecting the thermometer and having a longitudinal slot alined with the prismatic or magnifying portion of the thermometer, said shield having the parallel edges of its slot reinforced and colored.

7. A thermomenter of the class described having a shield covering and protecting the thermometer and having a longitudinal slot alined with the prismatic or magnifying portion of the thermometer, said shield having colored curled or bent edges along the parallel edges of its slot.

LEOPOLD E. GREINER, Jr.